US010155627B2

(12) United States Patent
Chang

(10) Patent No.: US 10,155,627 B2
(45) Date of Patent: Dec. 18, 2018

(54) TAPERED DRIVE BAR APPARATUS

(71) Applicant: FPS FOOD PROCESS SOLUTIONS CORPORATION, Richmond (CA)

(72) Inventor: Kin Hung Jeffrey Chang, Vancouver (CA)

(73) Assignee: FPS Food Process Solutions Corporation, Richmond, CA (US)

( * ) Notice: Subject to any disclaimer, the term of this patent is extended or adjusted under 35 U.S.C. 154(b) by 0 days.

(21) Appl. No.: 15/572,450

(22) PCT Filed: May 9, 2016

(86) PCT No.: PCT/CA2016/050533

§ 371 (c)(1),
(2) Date: Nov. 7, 2017

(87) PCT Pub. No.: WO2016/179697

PCT Pub. Date: Nov. 17, 2016

(65) Prior Publication Data

US 2018/0170680 A1 Jun. 21, 2018

Related U.S. Application Data

(60) Provisional application No. 62/158,992, filed on May 8, 2015.

(51) Int. Cl.
*B65G 33/34* (2006.01)
*B65G 21/18* (2006.01)
*B65G 17/08* (2006.01)

(52) U.S. Cl.
CPC ........... *B65G 33/34* (2013.01); *B65G 17/086* (2013.01); *B65G 21/18* (2013.01); *B65G 2207/24* (2013.01)

(58) Field of Classification Search
CPC ...... B65G 33/24; B65G 17/086; B65G 21/18; B65G 21/16
USPC .......................................................... 198/778
See application file for complete search history.

(56) References Cited

U.S. PATENT DOCUMENTS 4,036,352 A 7/1977 White
4,450,953 A * 5/1984 Le Cann ................ B65G 21/18 198/778
4,741,430 A * 5/1988 Roinestad ............. B65G 21/18 198/778
4,852,720 A * 8/1989 Roinestad ............. B65G 21/18 198/778

(Continued)

*Primary Examiner* — William R Harp
(74) *Attorney, Agent, or Firm* — Lewis Roca Rothgerber Christie LLP

(57) ABSTRACT

The present disclosure relates to a drive bar apparatus for use in a helical conveyor system. In one embodiment, the drive bar apparatus includes at least one tapered drive bar configured to be mounted to a central drum of the helical conveyor system. Each of the at least one tapered drive bars includes a tapered tip having a conical outer surface for urging protrusions extending from conveyor belting to be engaged by the central drum to a first side or a second side of the at least one tapered drive bar. Each of the at least one tapered drive bars further includes a bar portion extending from the tapered tip and having a varying height which increases from the tapered tip to enable the bar portion to progressively increase engagement with the protrusions as the conveyor belting moves up the central drum.

10 Claims, 8 Drawing Sheets

(56) References Cited

U.S. PATENT DOCUMENTS

| | | | | |
|---|---|---|---|---|
| 4,944,162 | A * | 7/1990 | Lang | B65G 17/062 198/831 |
| 5,069,330 | A | 12/1991 | Palmaer et al. | |
| 5,133,449 | A | 7/1992 | Spangler | |
| 6,062,375 | A * | 5/2000 | Pupp | B65G 21/18 198/778 |
| 8,181,771 | B2 | 5/2012 | Talsma | |
| 9,079,719 | B2 * | 7/2015 | Talsma | B65G 21/18 |
| 9,394,109 | B2 * | 7/2016 | Talsma | B65G 21/18 |
| 9,884,723 | B2 * | 2/2018 | Neely | B65G 21/18 |
| 10,023,388 | B2 * | 7/2018 | Talsma | B65G 17/086 |
| 2011/0056806 | A1 | 3/2011 | Johnson | |
| 2012/0006654 | A1 | 1/2012 | Talsma | |
| 2015/0047952 | A1 | 2/2015 | Talsma et al. | |
| 2015/0090560 | A1 | 4/2015 | Talsma et al. | |

* cited by examiner

TAPERED DRIVE BAR APPARATUS

CROSS-REFERENCE TO RELATED APPLICATION(S)

This application is a National Phase Patent Application and claims priority to and the benefit of International Application Number PCT/CA2016/050533, filed on May 9, 2016, which claims priority to and the benefit of U.S. Provisional Application Number 62/158,992, filed on May 8, 2015, the entire disclosures of which are incorporated herein by reference.

FIELD

The present disclosure relates to a drive bar apparatus for use in a helical conveyor system.

BACKGROUND

Currently, helical conveyor systems which utilize a central drum as the driving force to convey belting either in an upwards or downwards direction utilize a "drive bar" on the central drum to engage with protrusions extending from an inside edge of the belting and hence push the conveyor belt in a direction of travel. One such example of a drive mechanism is disclosed in U.S. Pat. No. 8,181,771, "Positive-Drive Spiral Conveyor", issued May 22, 2012, which is incorporated herein by reference.

However, current designs of the drive bars experience many problems with the belting not engaging correctly with the drive bars, thereby causing improper engagement with the central drum. Additionally, current designs of the drive bars use plastic drive bar caps which are attached to a metal central drum using bolts or similar means, which introduces a number of catch-points which increase the probability of harboring bacteria or other contaminants.

SUMMARY

In one embodiment there is provided a drive bar apparatus for use in a helical conveyor system. The drive bar apparatus includes at least one tapered drive bar configured to be mounted to a central drum of the helical conveyor system. Each of the at least one tapered drive bars includes a tapered tip having a conical outer surface for urging protrusions extending from conveyor belting to be engaged by the central drum to a first side or a second side of the at least one tapered drive bar. Each of the at least one tapered drive bars further includes a bar portion extending from the tapered tip and having a varying height which increases from the tapered tip to enable the bar portion to progressively increase engagement with the protrusions as the conveyor belting moves up the central drum.

In this respect, before explaining at least one embodiment of the system of the present disclosure in detail, it is to be understood that the present system is not limited in its application to the details of construction and to the arrangements of the components set forth in the following description or illustrated in the drawings. The present system is capable of other embodiments and of being practiced and carried out in various ways. Also, it is to be understood that the phraseology and terminology employed herein are for the purpose of description and should not be regarded as limiting.

DETAILED DESCRIPTION

As noted above, the present disclosure relates to a drive bar apparatus for use in a conveyor system, and more particularly for helical conveyor systems which utilize a central drum as the driving force to move conveyor belting either up or down the central drum.

Figure 1:
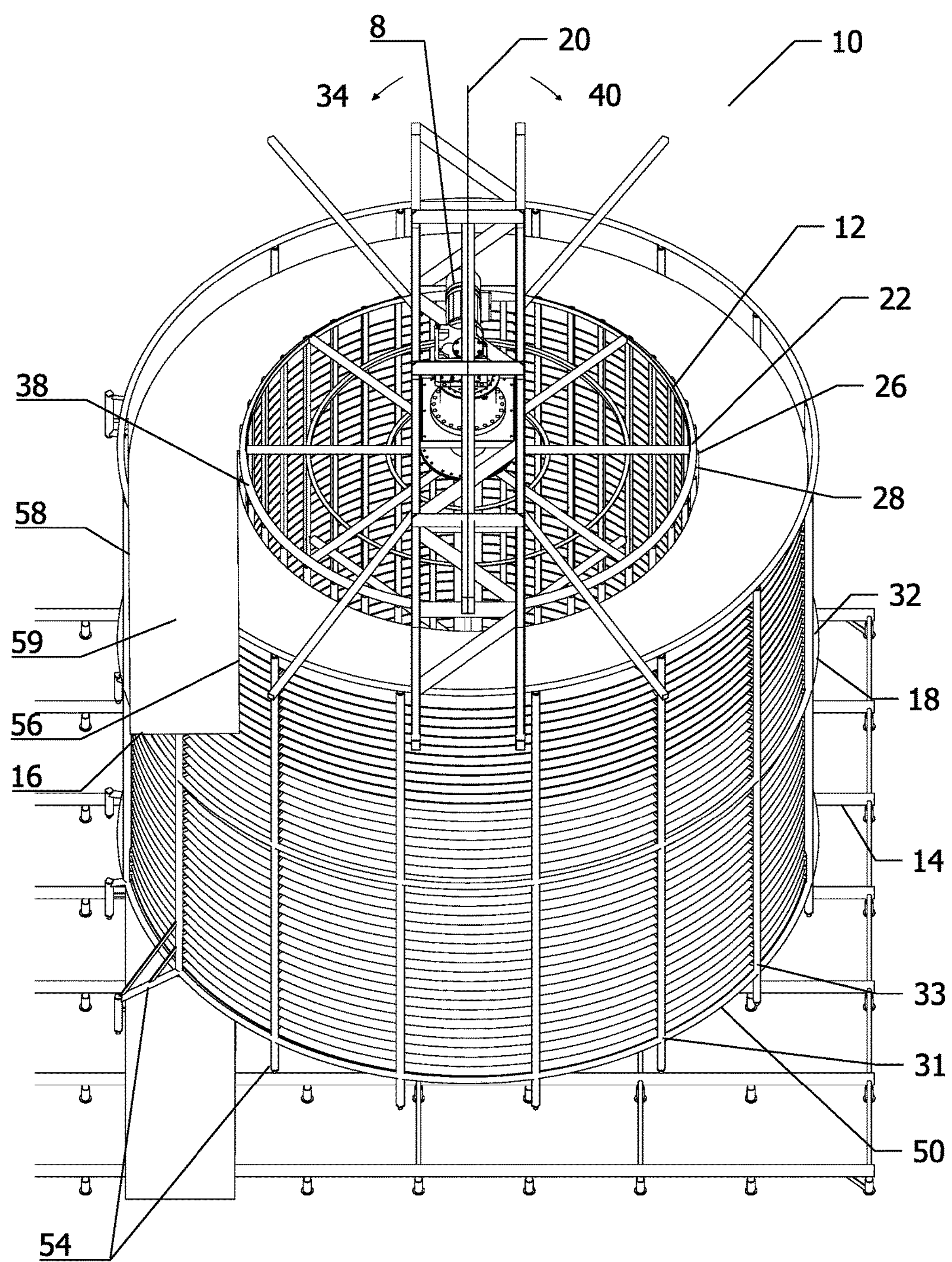
FIG. 1 is a perspective top view of a helical conveyor system in accordance with an illustrative embodiment.

Referring to FIG. 1, a helical conveyor system in accordance with an illustrative embodiment is shown generally at 10. In this illustrative embodiment, the helical conveyor system 10 includes a central drum 12, a base 14, conveyor belting 16 and an external framework 18.

Figure 2:
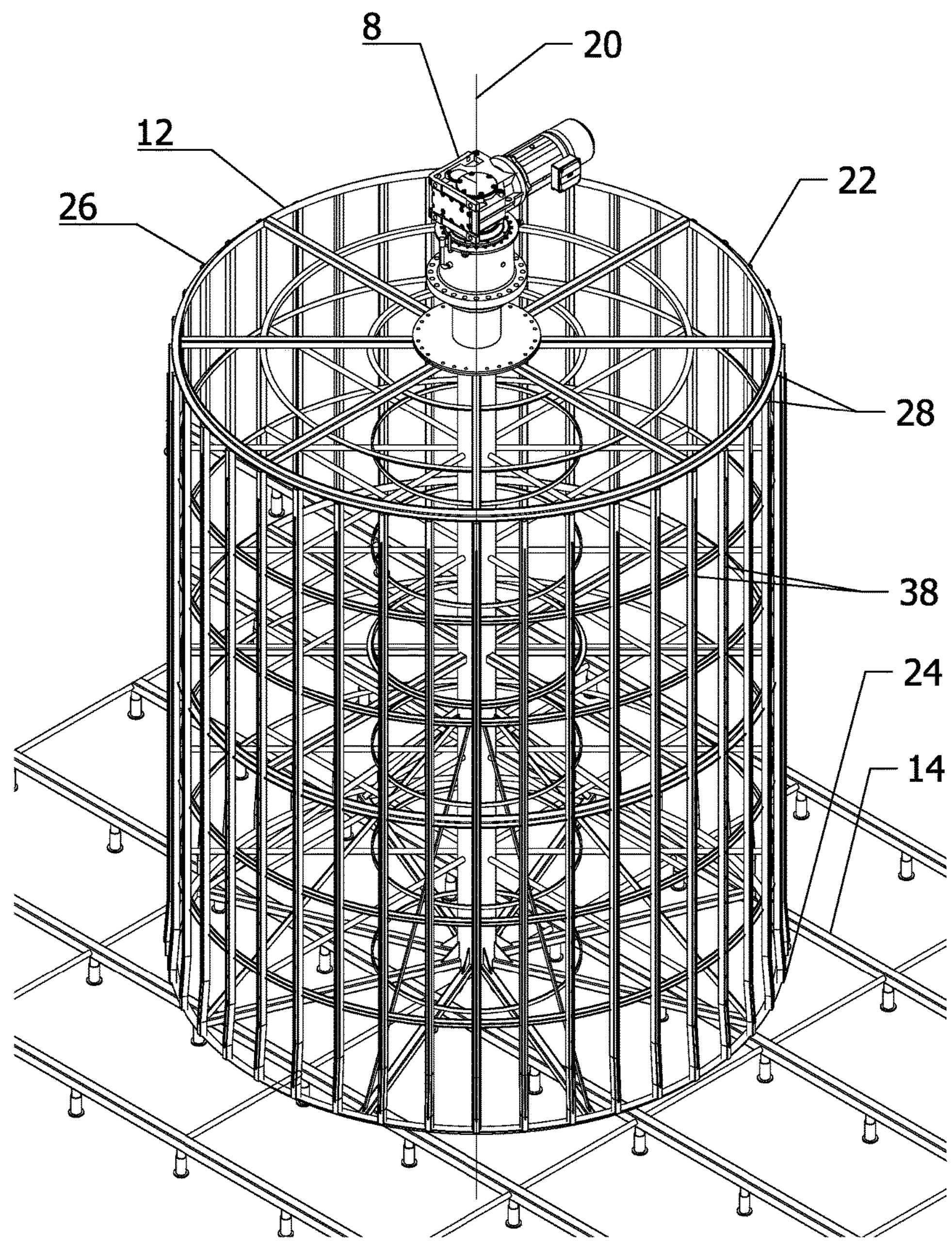
FIG. 2 is a perspective side view of a central drum of the helical conveyor system of FIG. 1 comprising a plurality of parallel, generally vertical frame members.
Figure 3C:
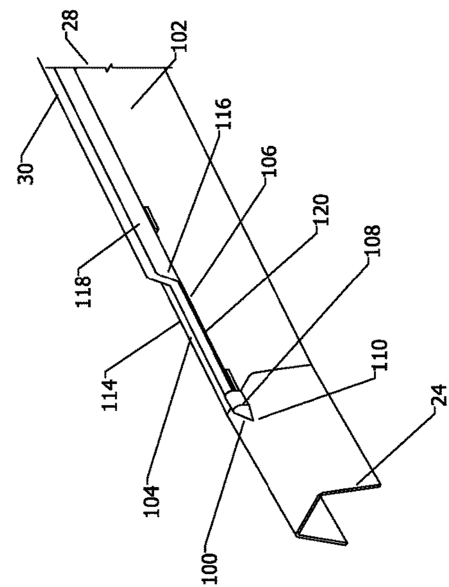
FIGS. 3A-3C are, respectively, side elevation, front elevation and front isometric views of a lower portion of a tapered drive bar mounted on one of the plurality of frame members of FIG. 2.
Figure 3B:
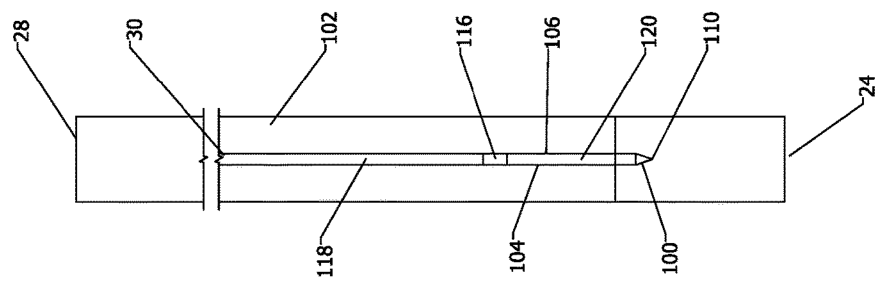
Figure 3A:
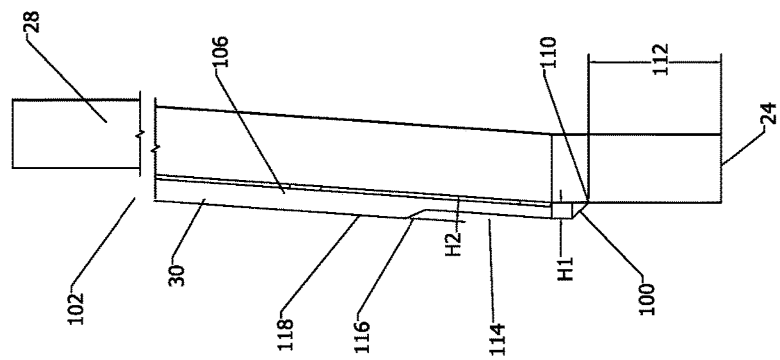
Figure 4:
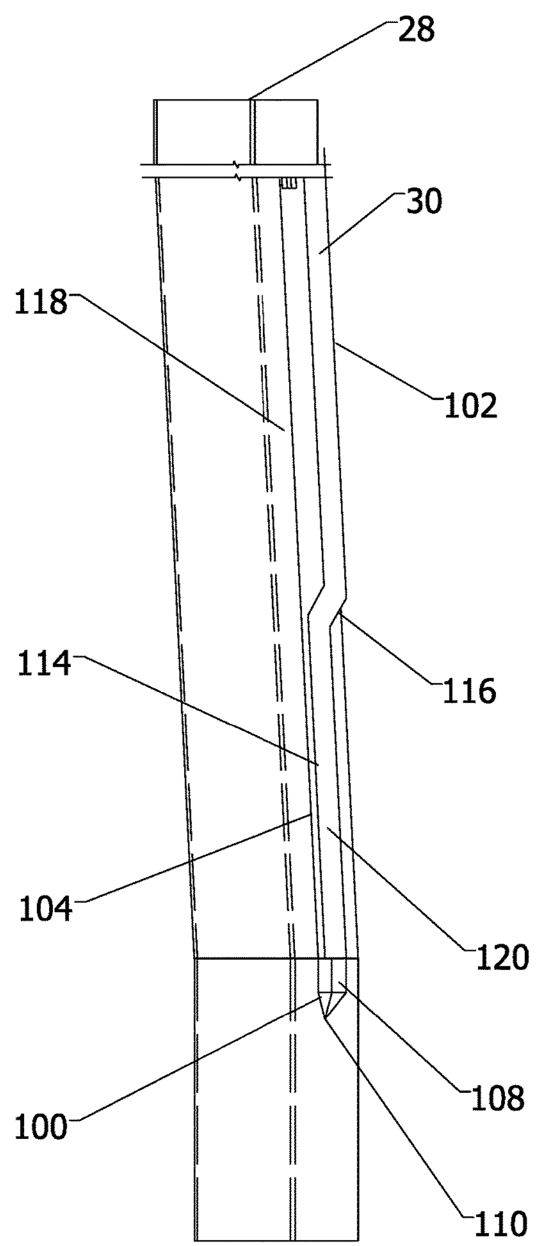
FIG. 4 is a perspective side view of a lower portion of the tapered drive bar of FIGS. 3A-3C mounted on one of the plurality of frame members of FIG. 2.

Referring to FIGS. 1 and 2, the central drum 12 is a cylindrical drum or cage having a top end 22, a bottom end 24 (shown in FIG. 2) and a periphery 26. The central drum 12 includes a plurality of parallel, generally vertical frame members 28 extending between the top end 22 and the bottom end 24 and spaced apart regularly around the periphery 26. At least some of the frame members 28 include a tapered drive bar 30 mounted thereon (shown in FIG. 2). In the embodiment shown, each frame member 28 having one of the tapered drive bars 30 mounted thereon are spaced a uniform distance apart from adjacent frame members 28 having another one of the tapered drive bars 30 mounted thereon such that the tapered drive bars 30 are also spaced regularly around the periphery 26.

Referring to FIGS. 3A-3C and FIG. 4, a bottom portion of the tapered drive bar 30 mounted on the corresponding frame member 28 and adjacent the bottom end 24 of the central drum 12 is shown in greater detail. The tapered drive bar 30 may be attached to the frame member 28 by means of welding, for example. However, it will be appreciated that the tapered drive bar 30 may be attached to the frame member 28 in another manner to eliminate catch-points. For example, the tapered drive bar 30 may also be formed integrally into the frame member 28 if the frame member 28 is cast, or machined from solid metal stock. Other attachment means eliminating catch-points are also possible.

In the embodiment shown, each tapered drive bar 30 is formed of a continuous piece of metal, such a stainless steel for example. The continuous structure and metal construction of the tapered drive bar 30 decreases the number of catch-points and also decreases the probability that the tapered drive bar 30 will harbor bacteria or other contaminants when the tapered drive bar 30 is attached to and used with a helical conveyor system requiring a high level of hygiene (e.g. food processing).

The tapered drive bar 30 includes a tapered tip 100, a bar portion 102, a first side surface 104 and a second side surface 106. The tapered tip 100 includes a conical outer surface 108 (best shown in FIG. 4) and a tapering tip height which decreases to a point 110 substantially level with the frame member 28. The tapered drive bar 30 is mounted on the frame members 28 such that the point 110 is spaced apart from the bottom end 24 of the central drum 12 by a distance 112 (shown in FIGS. 3A and 3B).

The bar portion 102 extends from the tapered tip 100 and includes a varying height which increases away from the tapered tip 100. For example, the bar portion 102 may comprise a plurality of steps of different heights. In the embodiment shown, the bar portion 102 comprises a stepped fin including an first step 114 having a first height $H_1$, a tapered step 116 having a tapering height, and an second step 118 having a second height $H_2$ greater than the first height $H_1$. In other embodiments, the bar portion 102 may have a third step having a third height, and a fourth step having a fourth height and so forth.

The first step 114 extends from the tapered tip 100 and includes a top surface 120. In the embodiment shown, at least a portion of the top surface 120 of a bottom portion of the first step 114 adjacent the tapered tip 100 (best shown in FIG. 4) includes a curvature. The tapered step 116 extends between the first step 114 and the second step 118. The tapering height generally increases from the lower first height $H_1$ of first step 114 to the higher second height $H_2$ of the second step 118. The second step 118 extends from the tapered step 116 and towards the top end 22 of the central drum 12 along a majority of a length of the frame member 28. At the upper end of the tapered drive bar 30, a top portion of the drive bar may have a similar stepped and tapered structure.

Referring back to FIGS. 1 and 2, the central drum 12 is mounted at the bottom end 24 to the base 14 and is driven to rotate about a vertical axis of rotation 20 by a motor 8. The central drum 12 may be driven by motor 8 to rotate in a clockwise direction represented by arrow 40 or a counter-clockwise direction represented by arrow 34.

The base 14 is coupled to the external framework 18 which generally supports the conveyor belting 16 throughout the helical conveyor system 10. In the embodiment shown, the external framework 18 includes bottom support rings 50 and rollers 54 around which the conveyor belting 16 travels when not engaged by central drum 12. In other words, conveyor belting 16 forms a continuous loop which travels in generally straight segments about rollers 54 between the conveyor belting 16 engaging and disengaging the central drum 12 at the top and bottom of the drum.

Figure 6A:
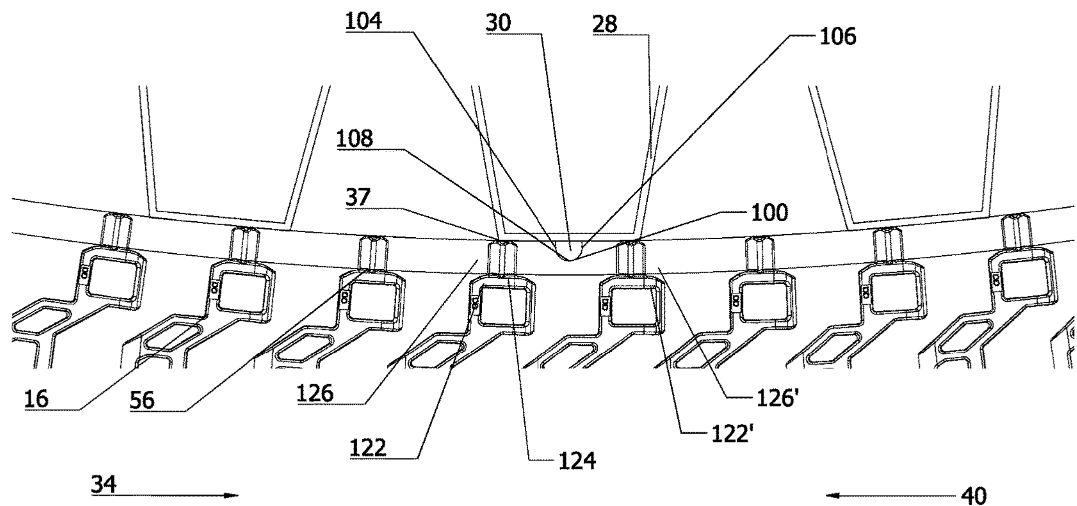
FIG. 6A is a top cross-sectional view of the tapered drive bar, the frame members, and conveyor belting of FIG. 5, taken along line 6A-6A.

Referring to FIGS. 1 and 6A, the conveyor belting 16 generally includes an inside edge 56, an outside edge 58 and a conveying surface 59 disposed between the edges for supporting articles to be transported along the conveyor belting 16. The inside edge 56 includes a plurality of protrusions 122 (shown in FIG. 6A) that positively engage the tapered drive bars 30 of the central drum 12 to drive the conveyor belting along a multi-layer helical path 32 (shown in FIG. 1) as the central drum 12 rotates about the axis 20.

In the embodiment show, each of the protrusions 122 comprises a cylindrical lug having a first end 124 attached to the inside edge 56 of the conveyor belting 16, a contact surface 126 and an end surface 128 opposite the first end 124 (shown in FIG. 6A).

Depending on the direction the central drum 12 is driven, the contact surfaces 126 of the protrusions 122 bears against either the first side surfaces 104 or the second side surfaces 106 of the tapered drive bars 30 to drive the conveyor belting 16 along the multi-layer helical path 32. For example, if the central drum 12 is driven in the direction of arrow 34, the conveyor belting 16 engages the central drum 12 at a bottom region 37 tangential to the central drum 12 (shown in FIG. 6A), disengages the central drum 12 at a top region 38 tangential to the central drum 12 (shown in FIG. 1), and the contact surfaces 126 bear against respective second side surfaces 106 to drive the conveyor belting 16 in a clockwise spiral up the helical path 32; alternatively, if the central drum 12 is driven in the direction of arrow 40, the conveyor belting 16 engages the central drum 12 at the top region 38, disengages the central drum 12 at the bottom region 37, and the contact surfaces 126 bear against respective first side surfaces 104 to drive the conveyor belting 16 in a counter-clockwise spiral down the helical path 32.

Referring to back to FIG. 1, in the embodiment shown, the conveyor belting 16 is a self-stacking conveyor belt having stacking side plates (not shown) coupled to at least one of the inside edge 56 or the outside edge 58. A first layer 31 of multi-layer helical path 32 is defined by a first level of the conveyor belting 16 supported on the bottom support rings 50 of the external framework 18. A second layer 33 of the multi-layer helical path 32 is then defined by a second level of conveyor belting 16 supported by the stacking side plates of the first layer 31. Subsequent layers of the helical path 32 are similarly thus supported by the stacking side plates of a previous level of the conveyor belting 16. One such example of a self-stacking conveyor belt is disclosed in U.S. Pat. No. 9,334,121, "Self-Stacking Spiral Modular Plastic Conveyor Belt", issued on May 10, 2016, which is incorporated herein by reference.

Figure 5:
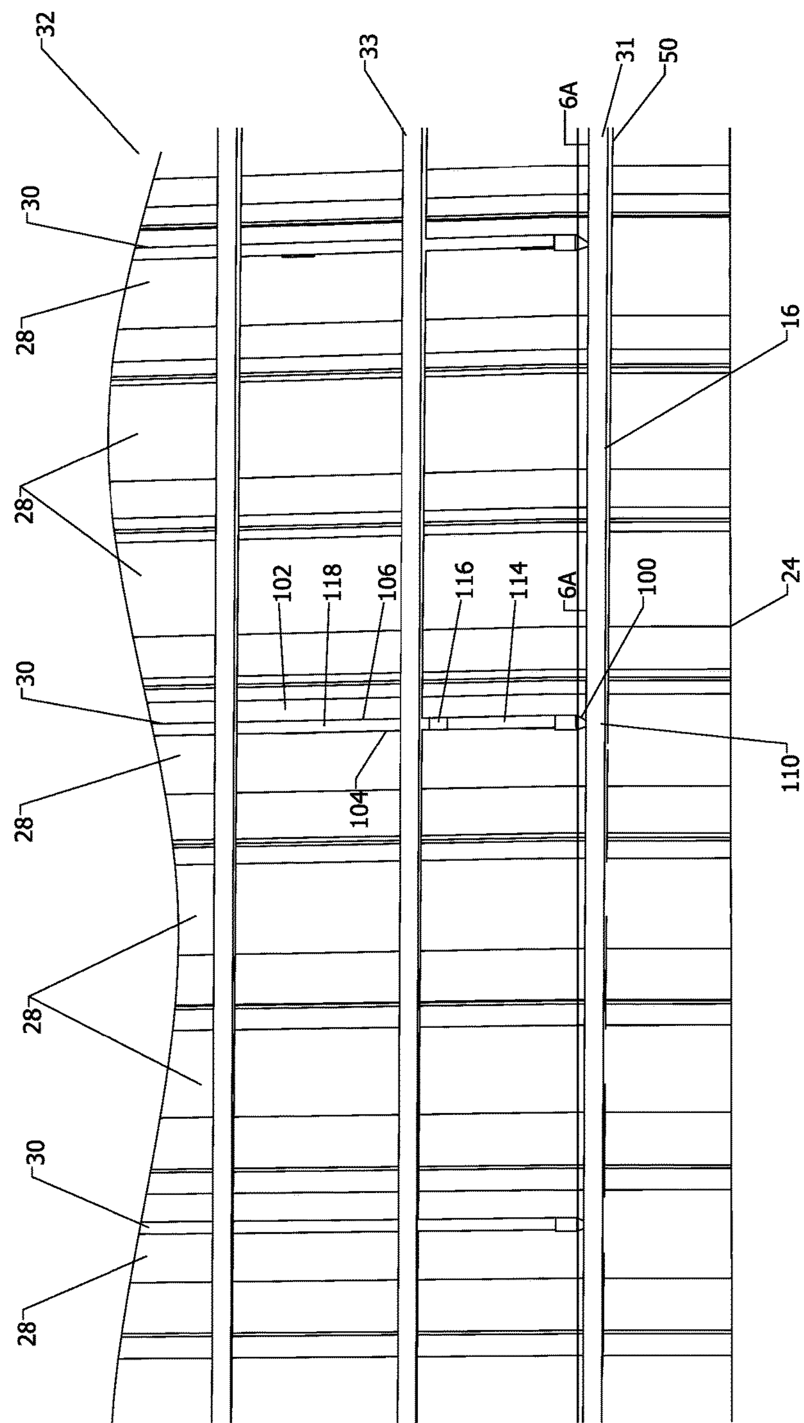
FIG. 5 is front view of a lower portion of the tapered drive bars of FIGS. 3A-3C mounted on corresponding ones of the plurality of frame members of FIG. 2 and further including conveyor belting of the helical conveyor system of FIG. 1.

Referring to FIGS. 5 and 6A, in operation, when the central drum is driven in the direction of arrow 34, the first step 114 of the tapered drive bar 30 is generally aligned with the first layer 31 of the helical path 32 formed by conveyor belting 16 while the second step 118 of the tapered drive bar 30 is generally aligned with the second layer 33 and subsequent layers of the helical path 32. Specifically, as the conveyor belting 16 moves up the central drum 12 along the helical path 32, some of the protrusions 122 on the inside edge 56 (shown in FIG. 6A) of the conveyor belting 16 would initially contact the tapered tip 100 of one of the tapered drive bars 30 at the bottom region 37. Depending on friction or any tension in the conveyor belting 16, the protrusions 122 may instead initially contact the bottom portion of the first step 114 proximate the tapered tip 100. The protrusions 122 then partially engage with the lower first height $H_1$ of the first step 114 of the bar portion 102 at the first layer 31 and then fully engage with the higher second height $H_2$ of the second step 118 of the bar portion 102 at the second layer 33, such that the bar portion 102 progressively increase engagement with the protrusions 122 as the conveyor belting 16 moves up the central drum 12 upwards along the helical path 32.

Figure 6B:
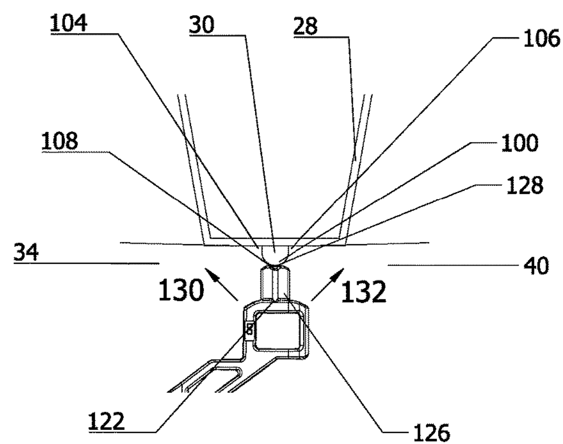
FIG. 6B is an enlarged view of the tapered drive bar, one of the frame members, and the conveyor belting of FIG. 6A in a moved position.

Referring to FIGS. 6A and 6B, the initial contact of the conveyor belting 16 with the tapered drive bar 30 at the bottom region 37 will now be described in greater detail. At the bottom region 37, the protrusion 122 may initially contact the tapered drive bar 30 at one of three places: a) the contact surface 126 may contact the first side surface 104; b) the contact surface 126 may contact the second side surface 106; and c) the end surface 128 may contact the conical outer surface 108 of the tapered tip 100 or the top surface 120 of the first step 114 (namely, in a "collision").

Figure 7A:
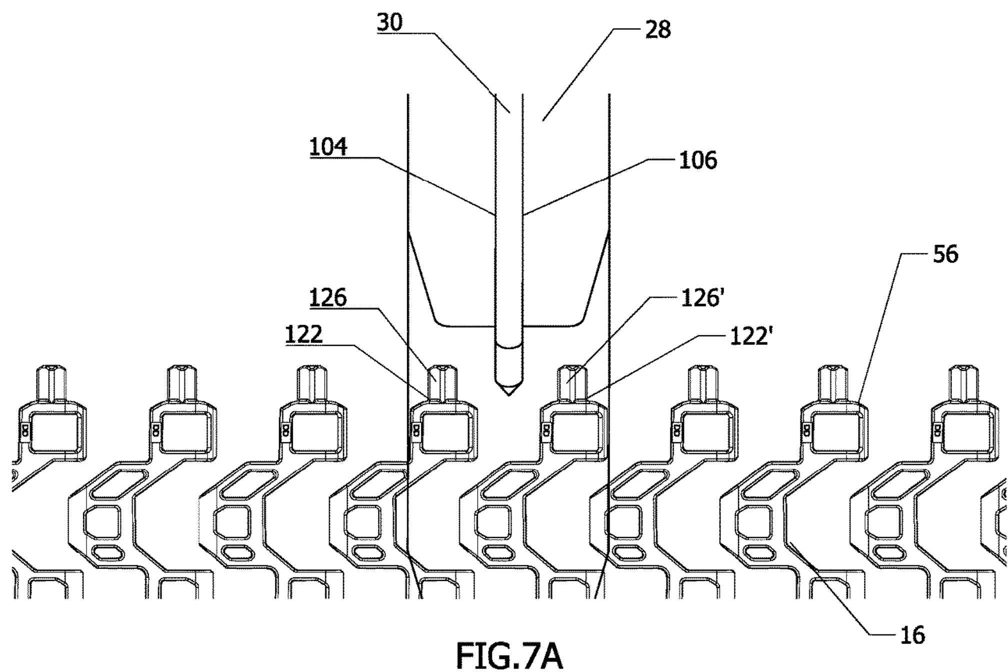
FIG. 7A is a top perspective view of a portion of the tapered drive bar of FIG. 6A engaging protrusions of the conveyor belting of FIG. 6A.
Figure 7B:
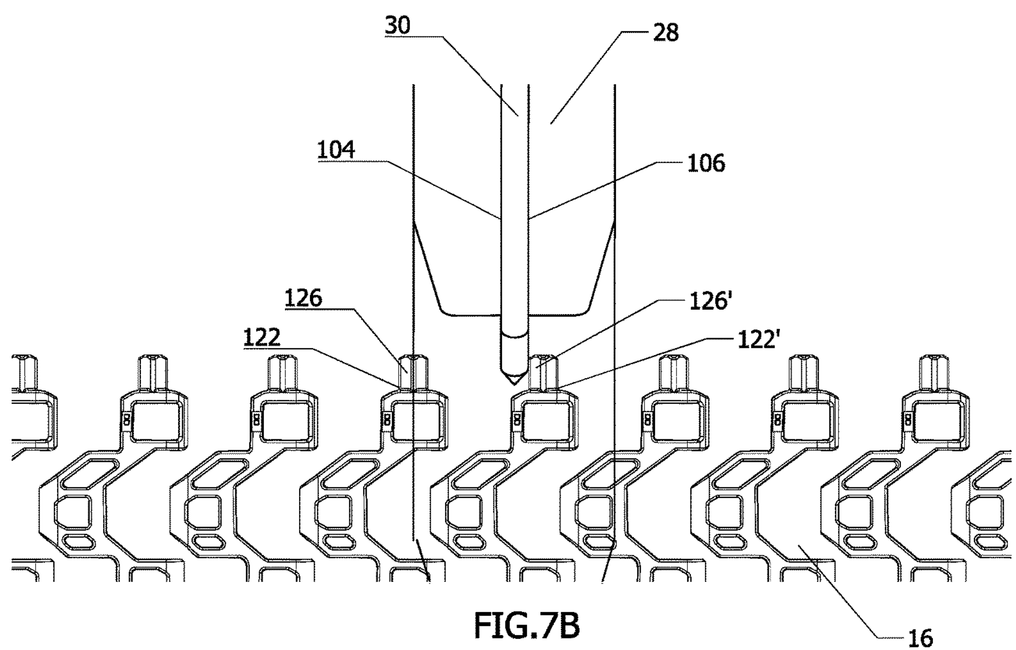
FIG. 7B is a top perspective view of the tapered drive bar and the conveyor belting of FIG. 7A in a moved position.

If the contact surface 126 of the protrusion 122 initially contacts the first side surface 104 of the tapered drive bar 30, the rotation of the central drum 12 in the direction of arrow 34 will cause the second side surface 106 of the tapered drive bar 30 to progress forward to bear against a contact surface 126' of an adjacent protrusion 122' to drive the conveyor belting 16 upwards along the helical path 32. For example, seen in FIGS. 7A and 7B, when the tapered drive bar 30 is engaged between the protrusions 122 and 122', the rotation of the central drum 12 in the direction of arrow 34 causes the tapered drive bar 30 to move towards the protrusion 122' until the second side surface 106 of the tapered drive bar 30 bears against the contact surface 126'.

Alternatively, if the contact surface 126 of the protrusion 122 initially contacts the second side surface 106 of the tapered drive bar 30, the rotation of the central drum 12 in the direction of arrow 34 causes the tapered drive bar 30 to move towards the protrusion 122 until the second side surface 106 bears against the contact surface 126 to drive the conveyor belting 16 upwards along the helical path 32.

Alternatively, if the end surface 128 of the protrusion 122 initially contacts the conical outer surface 108 of the tapered tip 100 (a "collision" shown in FIG. 6B), the conical outer surface 108 and the tapering tip height of the tapered tip 100 tends to urge the protrusion 122 in a direction represented by arrow 130 to a first side of the tapered drive bar 30 proximate the first side surface 104 or in a direction represented by arrow 132 to a second side of the tapered drive bar 30 proximate the second side surface 106, depending on the friction and the tension in the conveyor belting 16. The conical outer surface 108 and the tapering tip height of the tapered tip 100 thus tends to urge the protrusion 122 to positively engage with the tapered drive bar 30 after a collision to enable the conveyor belting 16 to be driven along the helical path 32 by the rotation of the central drum 12.

Figure 7C:
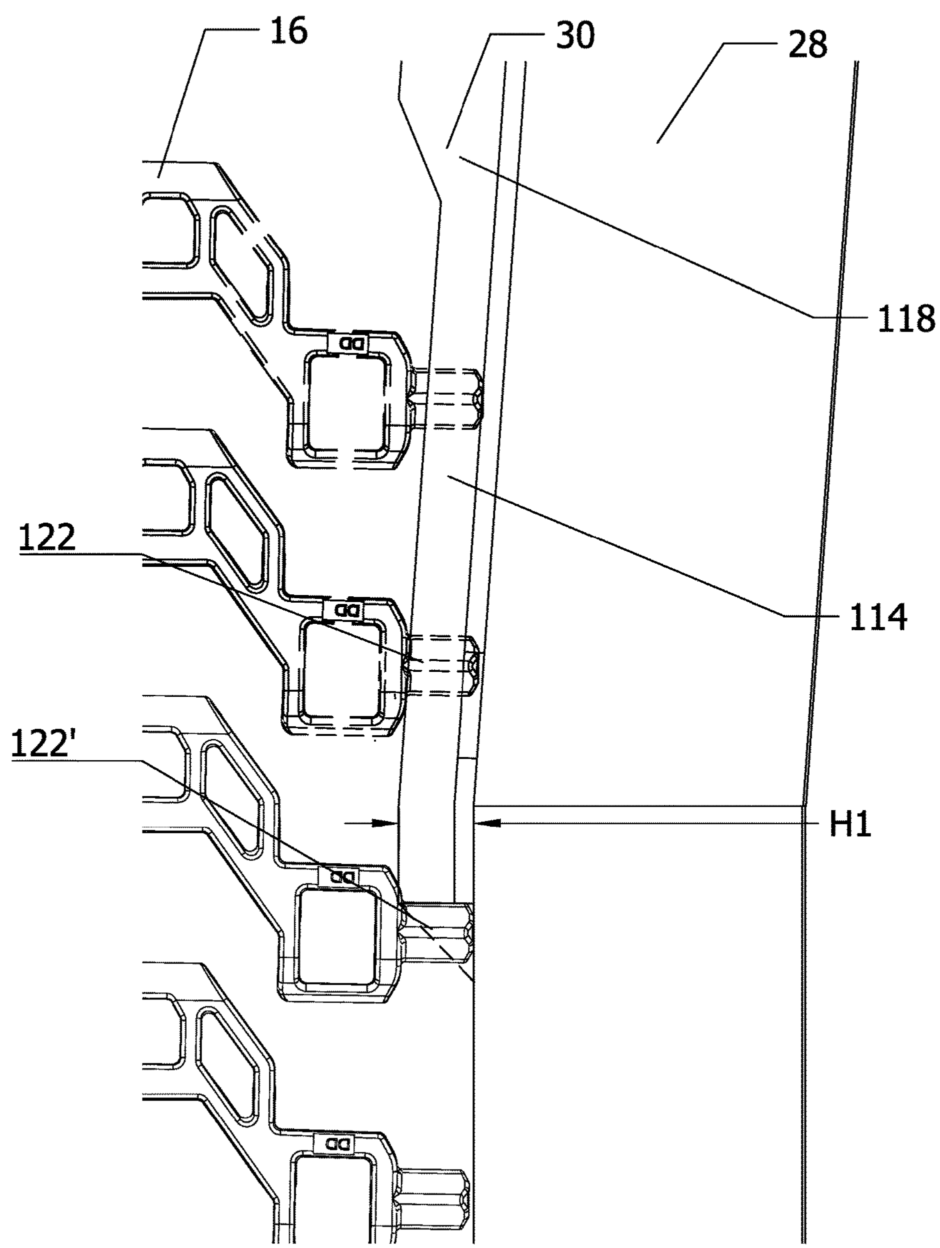
FIG. 7C is a side perspective view of the tapered drive bar and the conveyor belting of FIG. 7B in the moved position.

Similarly, if the end surface 128 of the protrusion 122 contacts the top surface 120 of the first step 114 (a "collision"), the curvature of the top surface 120 also tends to urge the protrusion 122 to the first side or the second side of the bar portion 102. Furthermore, as can be seen from FIG. 7C, the low first height $H_1$ of the first step 114 tends to avoid collisions between the top surface 120 of the first step 114 and the end surface 128 of the protrusion 122 as the conveyor belting 16 engages the central drum 12 at the bottom region 37 tangential to the central drum 12. The lower first height $H_1$ of first step 114 also tends to facilitate the urging of protrusions 122 away from the top surface 120 and towards the first side or the second side of the bar portion 102 after a collision.

In summary, the features of the tapered tip 100, including the conical outer surface 108 and the tapering tip height, tend to urge the protrusions 122 into positive engagement with the tapered drive bar 30 after a collision. Similarly, the features of the first step 114, including the curvature in the top surface 120 and the low height $H_1$, also tend to urge the protrusions 122 into positive engagement with the tapered drive bar 30 after a collision. Furthermore, the low height $H_1$ of the first step 114 also tends to avoid collisions between the protrusions 122 and the tapered drive bar 30. In combination, the features described above facilitates positive engagement of the protrusions 122 with the tapered drive bar 30 at the bottom region 37 and may increase reliability of helical spiral conveyor systems which utilize a central drum to convey belting.

While illustrative embodiments of the invention have been described above, it will be appreciate that various changes and modifications may be made without departing from the scope of the present invention.

The invention claimed is:

1. A drive bar apparatus for use in a helical conveyor system, comprising:

at least one tapered drive bar configured to be mounted to a central drum of the helical conveyor system, each of the at least one tapered drive bars comprising:

a tapered tip having a conical outer surface for urging protrusions extending from conveyor belting to be engaged by the central drum to a first side or a second side of the at least one tapered drive bar;

a bar portion extending from the tapered tip and having a varying height which increases from the tapered tip to enable the bar portion to progressively increase engagement with the protrusions as the conveyor belting moves up the central drum.

2. The drive bar apparatus of claim 1, wherein the bar portion includes a plurality of steps for incremental engagement of the bar portion with the protrusions extending from the conveyor belting.

3. The drive bar apparatus of claim 2, wherein the plurality of steps includes:

an first step extending from the tapered tip and having a first height; and an second step extending from the first step and having a second height greater than the first height.

4. The drive bar apparatus of claim 3, wherein the first height of the first step tends to avoid collisions between the bar portion and the protrusions as the conveyor belting engages the central drum at a region tangential to the central drum.

5. The drive bar apparatus of claim 3, wherein the first step includes an outer surface having a curvature for further urging the lugs to the first side or the second side of the at least one drive member.

6. The drive bar apparatus of claim 3, wherein the plurality of steps further includes a tapered step connecting the first step and the second step.

7. The drive bar apparatus of claim 3, wherein the first step is configured to engage a first layer of the conveyor belting and the second step is configured to engage a second layer of the conveyor belting.

8. The drive bar apparatus of claim 1, wherein the at least one tapered drive bar is configured to be mounted to the central drum such that the tapered tip of each of the at least one tapered drive bar is spaced apart from a bottom end of the central drum.

9. The drive bar apparatus of claim 1, wherein the at least one tapered drive bar configured to be mounted to the central drum comprises a plurality of tapered drive bars configured to be mounted to respective frame members of the central drum.

10. The drive bar mechanism of claim 9, wherein each respective frame member having one of the plurality of tapered drive bars mounted thereon are spaced a uniform distance from adjacent respective frame members having another one of the plurality of tapered drive bars mounted thereon around a periphery of the central drum.

* * * * *